US008965302B2

(12) United States Patent
Tamatsu

(10) Patent No.: US 8,965,302 B2
(45) Date of Patent: Feb. 24, 2015

(54) PORTABLE INFORMATION TERMINAL HOLDING BASE AND DESK TELEPHONE

(71) Applicant: Jun Tamatsu, Kanagawa (JP)

(72) Inventor: Jun Tamatsu, Kanagawa (JP)

(73) Assignee: Nec Infrontia Corporation, Kanagawa (JP)

( * ) Notice: Subject to any disclaimer, the term of this patent is extended or adjusted under 35 U.S.C. 154(b) by 0 days.

(21) Appl. No.: 14/345,036

(22) PCT Filed: Sep. 19, 2012

(86) PCT No.: PCT/JP2012/074602
§ 371 (c)(1),
(2) Date: Mar. 14, 2014

(87) PCT Pub. No.: WO2013/047539
PCT Pub. Date: Apr. 4, 2013

(65) Prior Publication Data
US 2014/0349591 A1    Nov. 27, 2014

(30) Foreign Application Priority Data

Sep. 26, 2011 (JP) ................................ 2011-208533

(51) Int. Cl.
*H04B 1/40* (2006.01)
*H04M 1/06* (2006.01)
*H04M 1/725* (2006.01)

(52) U.S. Cl.
CPC ................ *H04M 1/06* (2013.01); *H04M 1/725* (2013.01)
USPC ........................ 455/74.1; 455/550.1; 455/574

(58) Field of Classification Search
CPC ............................... H04M 1/06; H04M 1/725
USPC ...................... 455/573, 550.1, 74.1
See application file for complete search history.

(56) References Cited

U.S. PATENT DOCUMENTS

| 5,974,334 | A  | * | 10/1999 | Jones, Jr. .................. | 455/556.2 |
| 6,035,221 | A  | * | 3/2000  | Snyder et al. ............. | 455/569.1 |
| 6,816,740 | B2 | * | 11/2004 | Lin ............................. | 455/573 |
| 7,257,429 | B2 | * | 8/2007  | Kogan ........................ | 455/573 |

(Continued)

FOREIGN PATENT DOCUMENTS

| CN | 1690917 A   | 11/2005 |
| CN | 101072244 A | 11/2007 |

(Continued)

OTHER PUBLICATIONS

International Search Report for PCT/JP2012/074602 dated Nov. 6, 2012.

(Continued)

*Primary Examiner* — Lewis West
(74) *Attorney, Agent, or Firm* — Sughrue Mion, PLLC

(57) ABSTRACT

To enable a portable information terminal to be freely held at a position desired by a user, a holding base capable of holding one of a first portable information terminal and a second portable information terminal that is larger than the first portable information terminal includes a holding base main body having a main mounting surface inclined with respect to a horizontal surface. A terminal cover to be fixed to a lower end of the main mounting surface supports a lower end of the portable information terminal. An extensible holding member, which is provided on a first side edge portion side of the holding base main body and includes a slide plate that is slidable inside the holding base main body, has an extensible mounting surface that is movable in parallel to the main mounting surface and is capable of holding the second portable information terminal when the extensible holding member is extended to a predetermined extension position. A plurality of cradle tabs provided on the main mounting surface are brought into a state of being embedded below the main mounting surface when the plurality of cradle tabs are folded, and are projected above the main mounting surface when the plurality of cradle tabs are raised, thereby being capable of supporting a lower end of the first portable information terminal on the main mounting surface.

5 Claims, 11 Drawing Sheets

(56) References Cited

U.S. PATENT DOCUMENTS

| | | | |
|---|---|---|---|
| 7,415,292 B2* | 8/2008 | Park et al. | 455/573 |
| 7,483,679 B2* | 1/2009 | Kurobe et al. | 455/90.3 |
| 7,777,450 B2* | 8/2010 | Lee et al. | 320/115 |
| 8,165,643 B2* | 4/2012 | Lin | 455/573 |
| 8,442,455 B2* | 5/2013 | Choi | 455/90.3 |
| 8,825,118 B2* | 9/2014 | Kim et al. | 455/573 |
| 2001/0029195 A1* | 10/2001 | Lin | 455/573 |
| 2003/0083115 A1* | 5/2003 | Kato | 455/573 |
| 2003/0148798 A1* | 8/2003 | Asakura | 455/573 |
| 2010/0317413 A1* | 12/2010 | Tan | 455/573 |
| 2011/0306393 A1* | 12/2011 | Goldman et al. | 455/575.2 |

FOREIGN PATENT DOCUMENTS

| | | | |
|---|---|---|---|
| JP | 1-168154 A | 7/1989 |
| JP | 5-22390 A | 1/1993 |
| JP | 8-256200 A | 10/1996 |
| JP | 10-181462 A | 7/1998 |
| JP | 11-348677 A | 12/1999 |
| JP | 2000-174873 A | 6/2000 |
| JP | 3080744 U | 10/2001 |
| JP | 2004-260680 A | 9/2004 |
| JP | 3169098 U | 7/2011 |
| WO | 2009/078062 A1 | 6/2009 |

OTHER PUBLICATIONS

Communication dated Oct. 27, 2014, issued by the State Intellectual Property Office of the People's Republic of China in counterpart Application No. 201280045146.7.

* cited by examiner

PORTABLE INFORMATION TERMINAL HOLDING BASE AND DESK TELEPHONE

CROSS REFERENCE TO RELATED APPLICATIONS

This application is a National Stage of International Application No. PCT/JP2012/074602 filed Sep. 19, 2012, claiming priority based on Japanese Patent Application No. 2011-208533 filed Sep. 26, 2011, the contents of all of which are incorporated herein by reference in their entirety.

TECHNICAL FIELD

This invention relates to a portable information terminal holding base capable of holding a portable information terminal such as a tablet terminal (multifunction portable terminal) and a smartphone (highly functional mobile phone), and also relates to a desk phone.

BACKGROUND ART

Nowadays, various portable information terminals such as a tablet terminal (multifunction portable terminal) and a smartphone (highly functional mobile phone) are put on the market. iPad (trademark) is known as a typical example of the tablet terminal (multifunction portable terminal), and iPhone (trademark) is known as a typical example of the smartphone (highly functional mobile phone).

Hitherto, various holding bases capable of holding such portable information terminals have been proposed.

For example, WO 2009/078062 A (Patent Literature 1) discloses a holding base for holding a mobile phone in a removable manner. The holding base disclosed in Patent Literature 1 includes a bottom receiving section for supporting a bottom portion of the mobile phone, a back receiving section for supporting a back portion of the mobile phone, and arm sections for sandwiching and supporting both side surface portions of the mobile phone.

Further, JP-A-H-11-348677 (Patent Literature 2) discloses a mobile phone holder capable of holding mobile phones of various sizes. Patent Literature 2 discloses a holder including a top surface section, a width adjusting arm for sandwiching a phone, and a stopper for vertical mounting. The width adjusting arm is slidable inside a holder main body with respect to the holder main body, and is fixed with a screw at an arbitrary position. The stopper for vertical mounting is pivotally projected and retracted through a hole that is formed close to a lower end portion of the top surface section of the holder, and is pulled out when the holder is to be used in a relatively vertical posture, thereby being capable of holding a lower end of the phone.

CITATION LIST

Patent Literature

Patent Literature 1: WO 2009/078062 A (FIG. 1, paragraph [0017])

Patent Literature 2: JP-A-H-11-348677 (FIG. 13, paragraphs [0003] to [0007])

SUMMARY OF INVENTION

Problems to be Solved by the Invention

Patent Literatures 1 and 2 have the following problems.

In the holding base disclosed in Patent Literature 1, there is a problem in that the holding base is capable of holding only one type of mobile phone having predefined dimensions.

In Patent Literature 2, the lower end of the phone can be held by the stopper for vertical mounting, and hence there is a problem in that the holding position of the phone is fixed.

It is therefore an object of this invention to provide a portable information terminal holding base capable of freely holding a portable information terminal at a position desired by a user, and to provide a desk phone.

Means to Solve the Problems

According to one embodiment of the present invention, there is provided a portable information terminal holding base capable of holding one of a plurality of types of portable information terminals including at least a first portable information terminal and a second portable information device having larger length and width sizes than the first portable information terminal, the portable information terminal holding base including: a holding base main body having a main mounting surface inclined with respect to a horizontal surface; a terminal cover to be fixed to a lower end of the main mounting surface, the terminal cover being configured to support a lower end of the one of the plurality of types of portable information terminals to be held on the main mounting surface; an extensible holding member provided on a first side edge portion side of the holding base main body, the extensible holding member including a slide plate that is slidable inside the holding base main body, the extensible holding member having an extensible mounting surface that is movable in parallel to the main mounting surface, the extensible holding member being capable of holding the second portable information terminal when the extensible holding member is extended to a predetermined extension position; and a plurality of cradle tabs provided on the main mounting surface, the plurality of cradle tabs being brought into a state of being embedded below the main mounting surface when the plurality of cradle tabs are folded, and being projected above the main mounting surface when the plurality of cradle tabs are raised, thereby being capable of supporting a lower end of the first portable information terminal on the main mounting surface.

According to one embodiment of the present invention, there is provided a desk phone, including: the above-mentioned portable information terminal holding base; and a handset provided on a second side edge portion side of the holding base main body that is opposite to the extensible holding member.

Effect of the Invention

According to one embodiment of this invention, the plurality of cradle tabs are folded and raised, and thus the first portable information terminal can freely be held at a position desired by the user.

MODE FOR EMBODYING THE INVENTION

Next, exemplary embodiments of this invention are described in detail with reference to the drawings.

Figure 1:
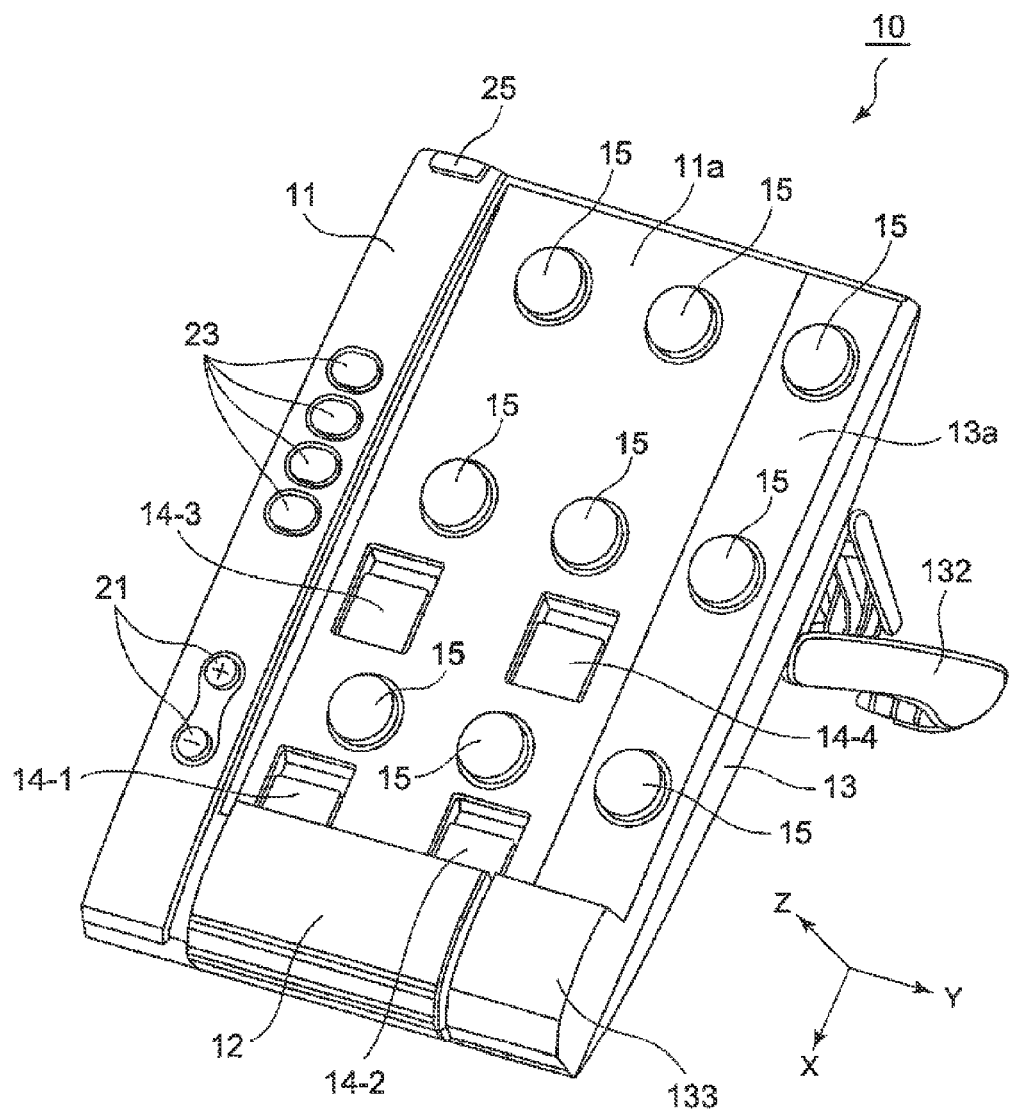
FIG. 1 is a perspective view illustrating a portable information terminal holding base according to a first exemplary embodiment of this invention.
Figure 2:
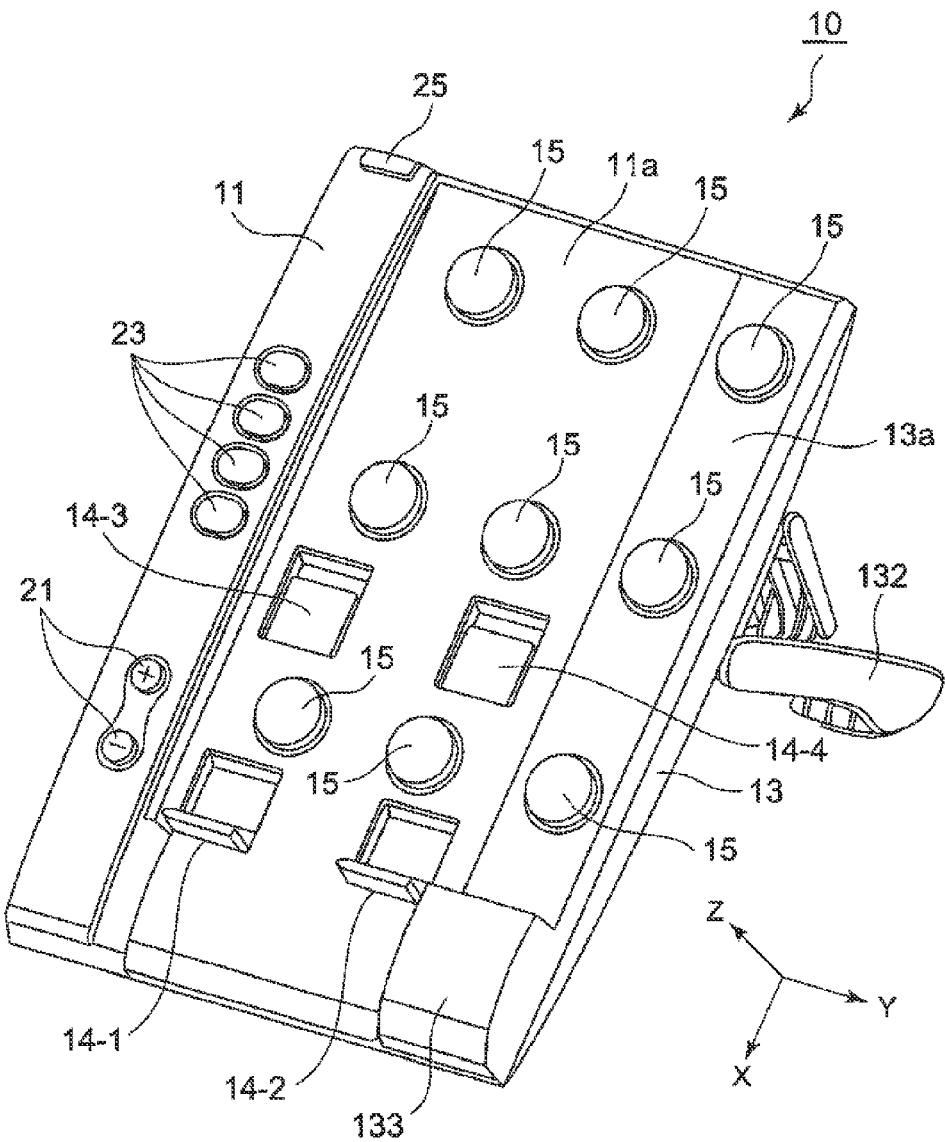
FIG. 2 is a perspective view illustrating a state in which a terminal cover is removed and cradle tabs are raised in the portable information terminal holding base illustrated in FIG. 1.
Figure 3:
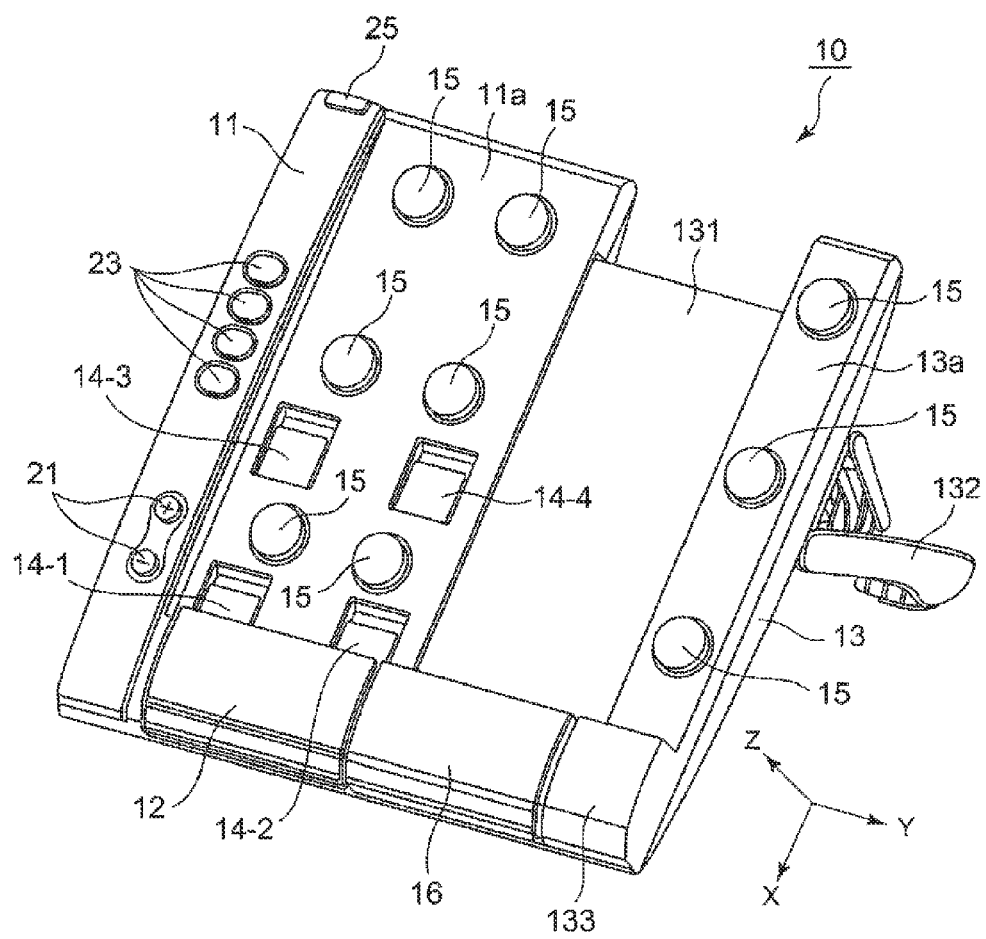
FIG. 3 is a perspective view illustrating a state in which an extensible holding member is extended and a cradle is fixed in the portable information terminal holding base illustrated in FIG. 1.

Referring to FIGS. 1 to 3, description will proceed to a portable information terminal holding base 10 according to a first exemplary embodiment of this invention. FIG. 1 is a perspective view illustrating the portable information terminal holding base 10. FIG. 2 is a perspective view illustrating a state in which a terminal cover 12 described later is removed and cradle tabs 14-1 and 14-2 described later are raised in the portable information terminal holding base 10 of FIG. 1. FIG. 3 is a perspective view illustrating a state in which an extensible holding member 13 described later is extended and a cradle 16 described later is fixed in the portable information terminal holding base 10 of FIG. 1.

The illustrated portable information terminal holding base 10 includes a holding base main body 11 having a main mounting surface 11a inclined at a predetermined angle with respect to a horizontal surface such as a desk. The holding base main body 11 includes a leg (not shown) on its back surface, for supporting the holding base main body 11. Thus, the leg allows the main mounting surface 11a to be inclined at the predetermined angle with respect to the horizontal surface.

As illustrated in FIGS. 1 to 3, a Cartesian coordinate system (X,Y,Z) is used herein. In the state illustrated in FIGS. 1 to 3, in the Cartesian coordinate system (X,Y,Z), the X-axis direction refers to a fore-and-aft direction (depth direction) extending parallel to the main mounting surface 11a, the Y-axis direction refers to a right-and-left direction (width direction) extending parallel to the main mounting surface 11a and orthogonal to the X-axis direction, and the Z-axis direction refers to an up-and-down direction (height direction) orthogonal to the main mounting surface 11a.

Figure 4:
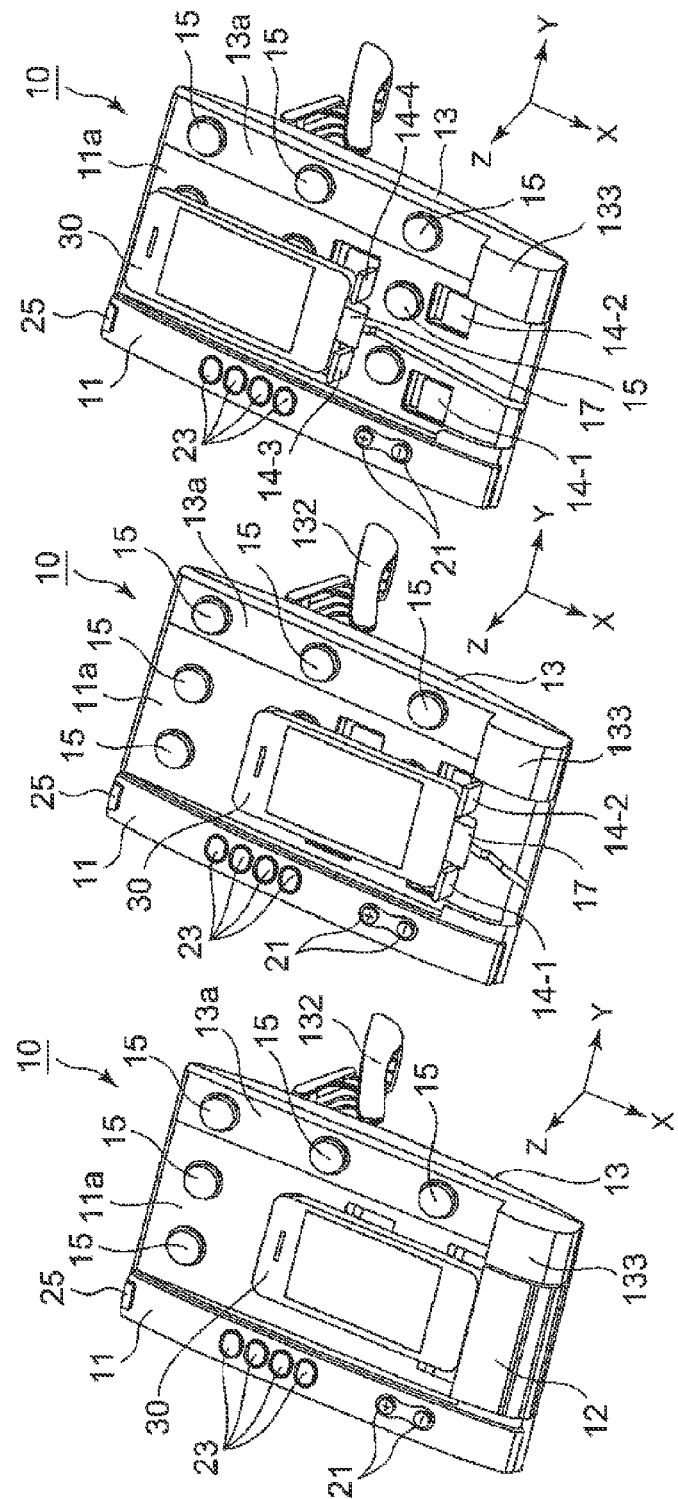
FIGS. 4A to 4C are perspective views each illustrating a state in which a first portable information terminal (smartphone) is held on the portable information terminal holding base illustrated in FIGS. 1 and 2.

The illustrated portable information device holding base 10 is a holding base capable of holding one of two types of portable information terminals including a first portable information terminal 30 (see FIG. 4) and a second portable information terminal 40 (see FIG. 5) having larger length and width sizes than the first portable information terminal.

In the example of the figures, the first portable information terminal 30 is a smartphone (highly functional mobile phone) such as iPhone, and the second portable information terminal 40 is a tablet terminal (multifunction portable terminal) such as iPad.

The portable information terminal holding base 10 includes the terminal cover 12 to be fixed to a lower end of the main mounting surface 11a. The terminal cover 12 is configured to support a lower end of one of the above-mentioned two types of portable information terminals 30 and 40 to be held on the main mounting surface 11a. FIG. 1 illustrates a state in which the terminal cover 12 is fixed to the lower end of the main mounting surface 11a while FIG. 2 illustrates a state in which the terminal cover 12 is removed from the lower end of the main mounting surface 11a.

The portable information terminal holding base 10 includes the extensible holding member 13 provided on a first side edge portion side (in the example of the figures, on a right edge portion side) of the holding base main body 11. The extensible holding member 13 includes a slide plate 131 that is slidable inside the holding base main body 11 in a direction away from the holding base main body 11 (in the example of the figures, in a rightward direction) (see FIG. 3). The extensible holding member 13 has an extensible mounting surface 13a that is movable in parallel to the main mounting surface 11a. The extensible holding member 13 includes a leg 132 similar to the above-mentioned leg of the holding base main body 11 on a back surface of the extensible holding member 13. Thus, the leg 132 allows the extensible mounting surface 13a to be inclined at a predetermined angle with respect to the horizontal surface.

Note that, in the example of the figures, the slide plate 131 is formed of a single slide plate alone, but the slide plate 131 is not limited to the single slide plate, and may be formed of a plurality of slide plates. That is, the slide plate may be formed of a plurality of slide plates each extending in the right-and-left direction Y.

When the extensible holding member 13 is extended to a predetermined extension position as illustrated in FIG. 3, the extensible holding member 13 can hold the second portable information terminal (tablet terminal) 40 in cooperation with the above-mentioned holding base main body 11. The extensible holding member 13 includes a stopper 133 for supporting the lower end of the second portable information terminal (tablet terminal) 40 when the extensible mounting surface 13a is extended to the predetermined extension position.

The portable information terminal holding base 10 includes first to fourth cradle tabs 14-1, 14-2, 14-3, and 14-4 provided on the main mounting surface 11a. In the example of the figures, the first and second cradle tabs 14-1 and 14-2 are arranged away from each other in the right-and-left direction Y at positions close to the lower end of the main mounting surface 11a. The third and fourth cradle tabs 14-3 and 14-4 are arranged away from each other in the right-and-left direction Y at positions above the first and second cradle tabs 14-1 and 14-2.

When the first to fourth cradle tabs 14-1 to 14-4 are folded, the first to fourth cradle tabs 14-1 to 14-4 are brought into a state of being embedded below the main mounting surface 11a. When the first to fourth cradle tabs 14-1 to 14-4 are raised, on the other hand, the first to fourth cradle tabs 14-1 to 14-4 are brought into a state of being projected above the main mounting surface 11a. FIG. 1 illustrates a state in which all the first to fourth cradle tabs 14-1 to 14-4 are folded. FIG. 2 illustrates a state in which the first and second cradle tabs 14-1 and 14-2 are raised and the third and fourth cradle tabs 14-3 and 14-4 are folded.

When the first and second cradle tabs 14-1 and 14-2 are raised as illustrated in FIG. 2, the first and second cradle tabs 14-1 and 14-2 can support the lower end of the first portable information terminal (smartphone) 30 on the main mounting surface 11a.

In the example of the figures, the portable information terminal holding base 10 includes the four cradle tabs 14-1 to 14-4, but the cradle tabs are not limited to the four cradle tabs, and only need to be a plurality of cradle tabs. Specifically, there is exemplified a case where the cradle tabs illustrated in the figures are a total of four cradle tabs arranged in two rows and two columns, that is, arranged in two rows along the right-and-left direction Y and in two columns along the fore-and-aft direction X. However, the cradle tabs may generally be a total of (M×N) cradle tabs arranged in M (M is an integer equal to or larger than 2) rows and N (N is an integer equal to or larger than 2) columns, that is, arranged in M rows along the right-and-left direction Y and in N columns along the fore-and-aft direction X. Further, in the example of the figures, the plurality of cradle tabs 14-1 to 14-4 are formed on the main mounting surface 11a alone, but a plurality of cradle tabs may be formed on both the main mounting surface 11a and the extensible mounting surface 13a.

The portable information terminal holding base 10 further includes nine cushions 15 formed on the main mounting surface 11a and the extensible mounting surface 13a. In the example of the figures, six cushions 15 are formed on the main mounting surface 11a, and three cushions 15 are formed on the extensible mounting surface 13a.

In the example of the figures, the portable information terminal holding base 10 includes the nine cushions 15, but the cushions 15 are not limited to the nine cushions, and only need to be a plurality of cushions. However, it is preferred that the cushions 15 be arranged in matrix as illustrated in FIG. 1.

As illustrated in FIG. 3, the portable information terminal holding base 10 further includes the cradle 16 to be fixed to a lower end of the slide plate 131 at a position between the main mounting surface 11a and the extensible mounting surface 13a when the extensible holding member 13 is extended to the predetermined extension position.

Note that, the illustrated portable information terminal holding base 10 includes volume buttons 21, a plurality of function buttons 23, and an incoming call lamp 25 at a second side edge portion (in the example of the figures, at a left edge portion) of the holding base main body 11.

Next, referring to FIGS. 4A to 4C and FIG. 5, description is given of a case where the first portable information terminal (smartphone) 30 or the second portable information terminal (tablet terminal) 40 is held on the portable information terminal holding base 10.

First, referring to FIGS. 4A to 4C, description is given of a case where the first portable information terminal (smartphone) 30 is held on the portable information terminal holding base 10. FIG. 4A illustrates a state in which the terminal cover 12 is fixed to the lower end of the main mounting surface 11a and all the first to fourth cradle tabs 14-1 to 14-4 are folded as illustrated in FIG. 1. FIG. 4B illustrates a state in which the terminal cover 12 is removed from the lower end of the main mounting surface 11a and only the first and second cradle tabs 14-1 and 14-2 are raised as illustrated in FIG. 2. FIG. 4C illustrates a state in which the terminal cover 12 is removed from the lower end of the main mounting surface 11a and only the third and fourth cradle tabs 14-3 and 14-4 are raised.

As illustrated in FIG. 4A, it is assumed that the terminal cover 12 is fixed to the lower end of the main mounting surface 11a under a state in which all the first to fourth cradle tabs 14-1 to 14-4 are folded. In this case, the lower end of the first portable information terminal (smartphone) 30 is supported by the terminal cover 12, and thus the first portable information terminal (smartphone) 30 can be held on the main mounting surface 11a.

On the other hand, as illustrated in FIG. 4B, it is assumed that the terminal cover 12 is removed from the lower end of the main mounting surface 11a and only the first and second cradle tabs 14-1 and 14-2 are raised. In this case, the lower end of the first portable information terminal (smartphone) 30 is supported by the first and second cradle tabs 14-1 and 14-2, and thus the first portable information terminal (smartphone) 30 can be held on the main mounting surface 11a.

Further, as illustrated in FIG. 4C, it is assumed that the terminal cover 12 is removed from the lower end of the main mounting surface 11a and only the third and fourth cradle tabs 14-3 and 14-4 are raised. In this case, the lower end of the first portable information terminal (smartphone) 30 is supported by the third and fourth cradle tabs 14-3 and 14-4, and thus the first portable information terminal (smartphone) 30 can be held on the main mounting surface 11a.

As described above, the portable information terminal holding base 10 includes the plurality of cradle tabs 14-1 to 14-4 as well as the terminal cover 12, and hence the first portable information terminal (smartphone) 30 can freely be held on the main mounting surface 11a at a position desired by a user.

Note that, the illustrated portable information terminal holding base 10 may also be used as a charging stand. That is, as illustrated in FIGS. 4B and 4C, the portable information terminal holding base 10 further includes a charging connector 17. The charging connector 17 is connected to a power outlet socket through an adapter (not shown) and a power supply cable (not shown) provided inside the portable information terminal holding base 10. On the other hand, as is well known, the first portable information terminal (smartphone) 30 includes a charging slot (not shown) at its lower end portion, to which the charging connector 17 is insertable. Thus, the charging connector 17 is inserted to the charging slot of the first portable information terminal (smartphone) 30 so that a secondary battery (lithium ion battery) built into the first portable information terminal (smartphone) 30 can be charged.

Figure 5:
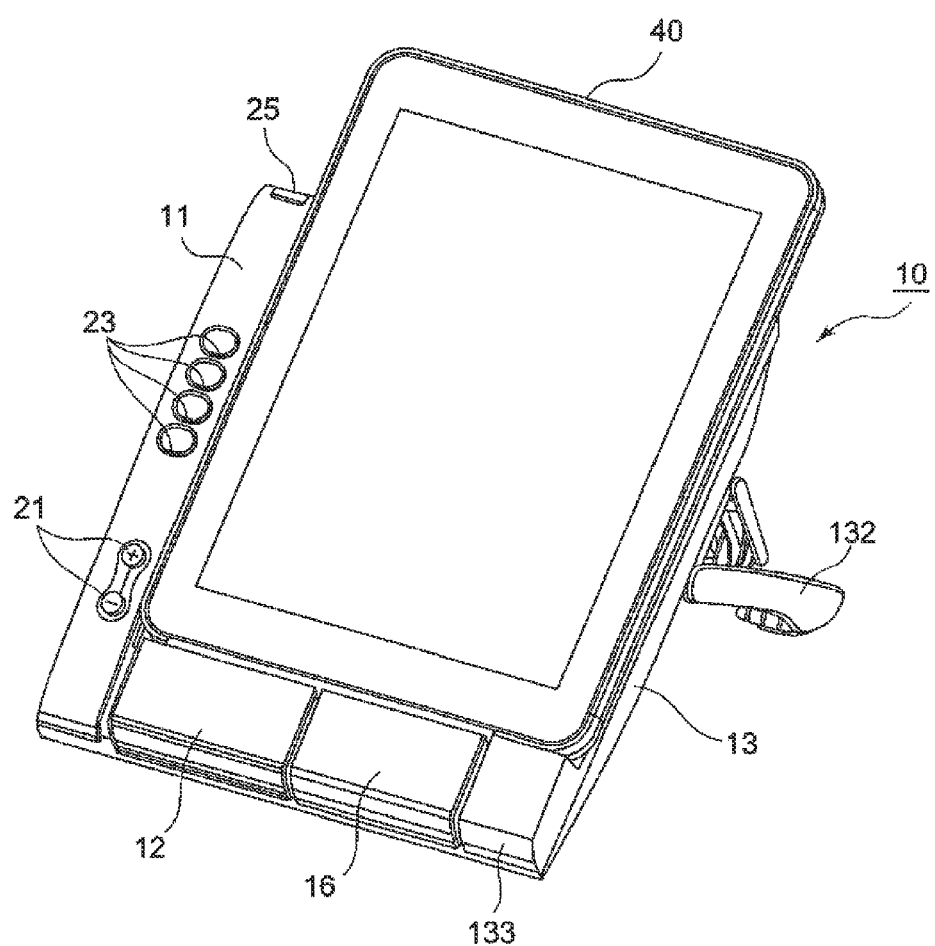
FIG. 5 is a perspective view illustrating a state in which a second portable information terminal (tablet terminal) is held on the portable information terminal holding base illustrated in FIG. 3.

Next, referring to FIG. 5, description is given of a case where the second portable information terminal (tablet terminal) 40 is held on the portable information terminal holding base 10.

In this case, in the portable information terminal holding base 10, as illustrated in FIG. 3, all the first to fourth cradle tabs 14-1 to 14-4 are folded, the terminal cover 12 is fixed to the lower end of the main mounting surface 11a, the extensible holding member 13 is extended to the predetermined extension position, and the cradle 16 is fixed to the lower end of the slide plate 131.

Thus, as illustrated in FIG. 5, the lower end of the second portable information terminal (tablet terminal) 40 is supported by the terminal cover 12, the cradle 16, and the stopper 133 of the extensible holding member 13, and thus the second portable information terminal (tablet terminal) 40 can be held on the main mounting surface 11a and the extensible mounting surface 13a.

In the above-mentioned first exemplary embodiment of this invention, the following effects are attained.

The first effect is that the first portable information terminal (smartphone) 30 can freely be held at a position desired by the user. The reason is because the portable information terminal holding base 10 includes the plurality of cradle tabs 14-1 to 14-4 as well as the terminal cover 12.

The second effect is that the second portable information terminal (tablet terminal) 40 can be held as well as the first portable information terminal (smartphone) 30. The reason is because the portable information terminal holding base 10 includes the extensible holding member 13 comprising the slide plate 131 that is slidable from inside the holding base main body 11.

Figure 6:
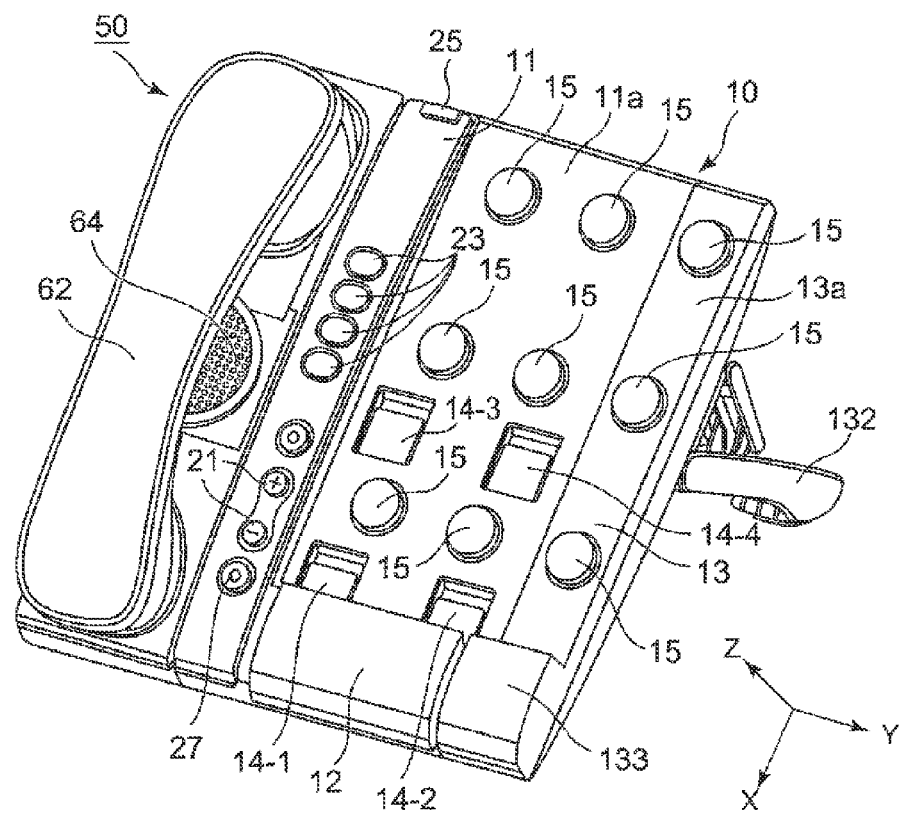
FIG. 6 is a perspective view illustrating a desk phone according to a second exemplary embodiment of this invention.
Figure 7:
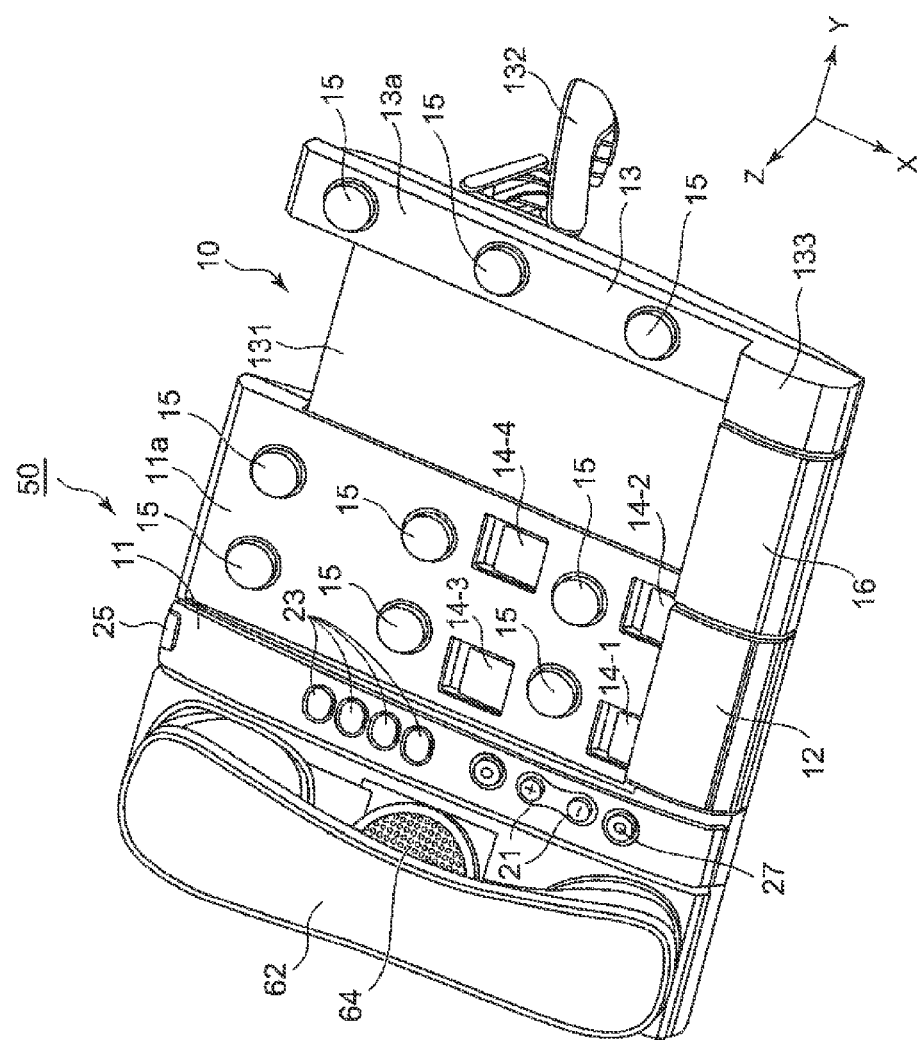
FIG. 7 is a perspective view illustrating a state in which the extensible holding member is extended in the desk phone of FIG. 6.
Figure 8:
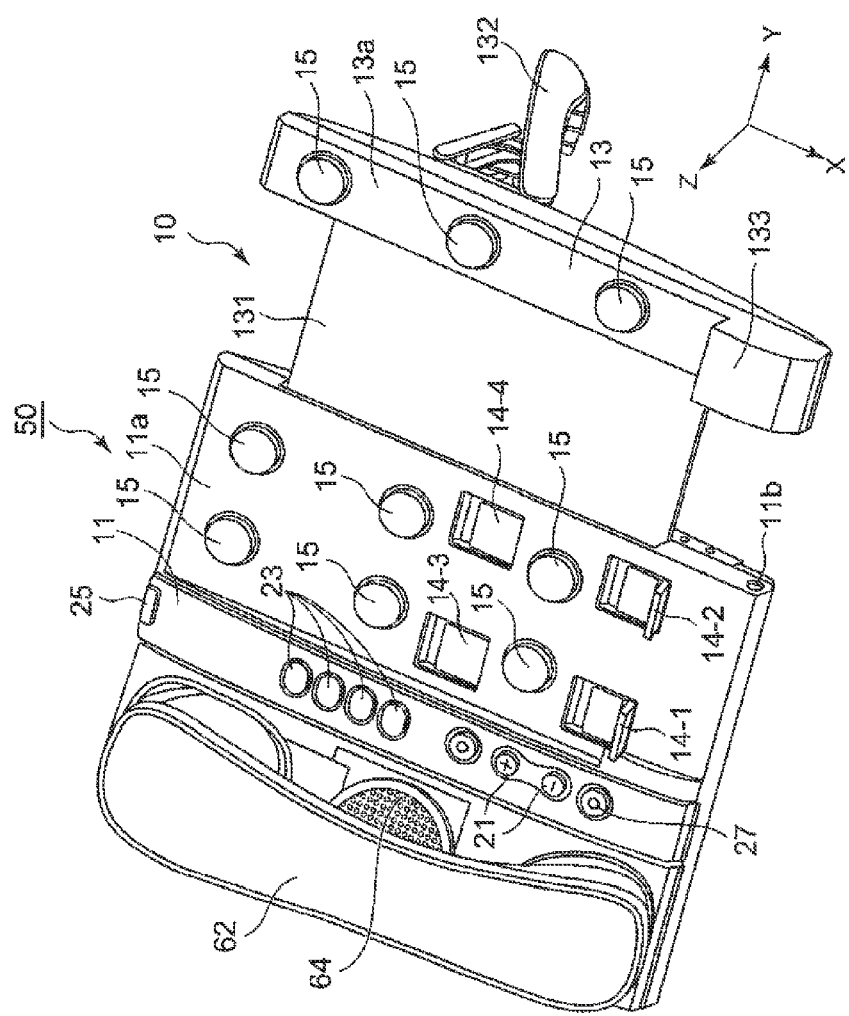
FIG. 8 is a perspective view illustrating a state in which the cradle and the terminal cover are removed and the first and second cradle tabs are raised in the desk phone of FIG. 7.

Referring to FIGS. 6 to 8, the description will proceed to a desk phone 50 according to a second exemplary embodiment of this invention. FIG. 6 is a perspective view illustrating the desk phone 50. FIG. 7 is a perspective view illustrating a state in which the extensible holding member 13 is extended in the desk phone 50 of FIG. 6. FIG. 8 is a perspective view illustrating a state in which the cradle 16 and the terminal cover 12 are removed and the first and second cradle tabs 14-1 and 14-2 are raised in the desk phone 50 of FIG. 7.

The illustrated desk phone 50 has a similar configuration to that of the portable information terminal holding base 10 illustrated in FIGS. 1 to 3 except that a handset 62 and a loudspeaker 64 are added as described later. Thus, components having similar functions to those illustrated in FIGS. 1 to 3 are represented by the same reference symbols, and only differences are therefore described below.

As illustrated in FIGS. 6 to 8, the Cartesian coordinate system (X,Y,Z) is used herein. In the state illustrated in FIGS. 6 to 10, in the Cartesian coordinate system (X,Y,Z), the X-axis direction refers to the fore-and-aft direction (depth direction) extending parallel to the main mounting surface 11a, the Y-axis direction refers to the right-and-left direction (width direction) extending parallel to the main mounting surface 11a and orthogonal to the X-axis direction, and the Z-axis direction refers to the up-and-down direction (height direction) orthogonal to the main mounting surface 11a.

The handset 62 and the loudspeaker 64 are provided on the second side edge portion side (in the example of the figures, on the left edge portion side) of the holding base main body 11 of the portable information terminal holding base 10.

Further, the desk phone 50 includes a Bluetooth (trademark) module cooperation button 27 at the second side edge portion (left edge portion) of the holding base main body 11.

Figure 9:
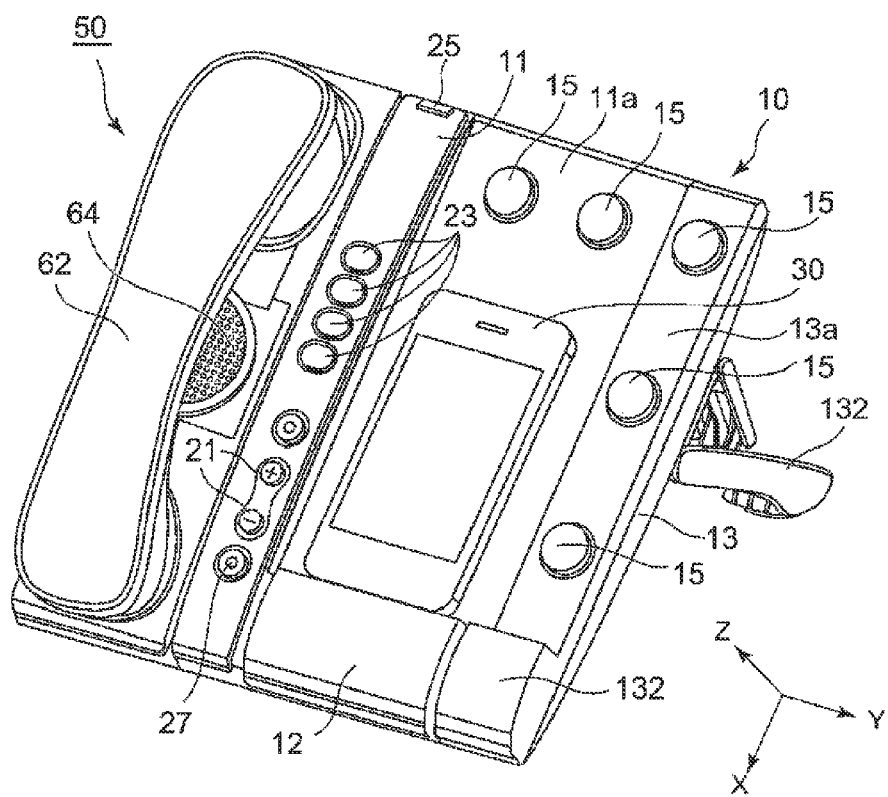
FIG. 9 is a perspective view illustrating a state in which the first portable information terminal (smartphone) is held on the portable information terminal holding base of the desk phone illustrated in FIG. 6.

FIG. 9 is a perspective view illustrating a state in which the first portable information terminal (smartphone) 30 is held on the main mounting surface 11a of the desk phone 50 illustrated in FIG. 6.

The first portable information terminal (smartphone) 30 has well-known Bluetooth installed thereon. On the other hand, the illustrated desk phone 50 has a Bluetooth module (not shown) installed thereon. Thus, when the Bluetooth module cooperation button 27 is depressed, the user can make phone conversations through use of the handset 62. In this case, the operation of making phone conversations is performed in the first portable information terminal (smartphone) 30.

Note that, the desk phone 50 itself can be used as an Internet Protocol (IP) phone compliant with the RFC-3261 protocol. That is, the desk phone 50 has a fixed number as the IP phone. However, the illustrated desk phone 50 does not include any dial button, and hence the desk phone 50 can only receive incoming calls.

Figure 10:
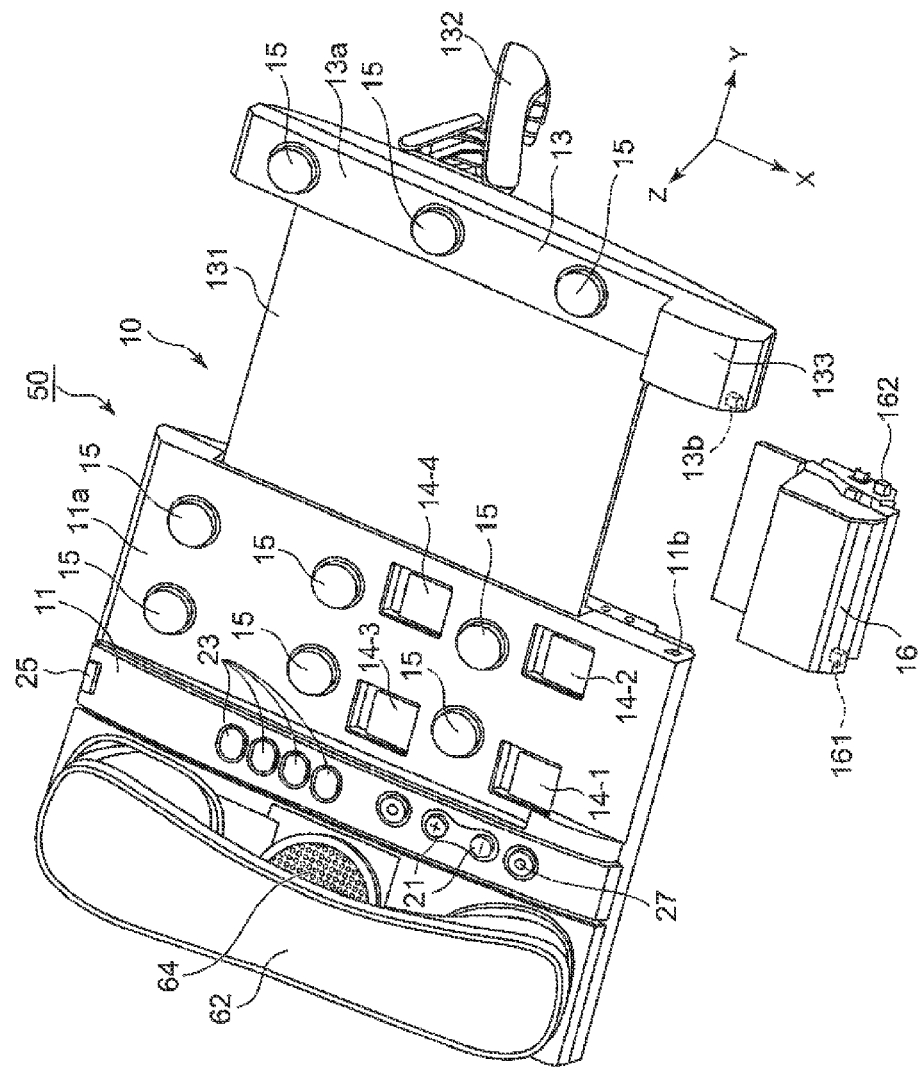
FIG. 10 is a perspective view illustrating a first step of fixing the cradle to a lower end of a slide plate in the desk phone of FIG. 6.
Figure 11:
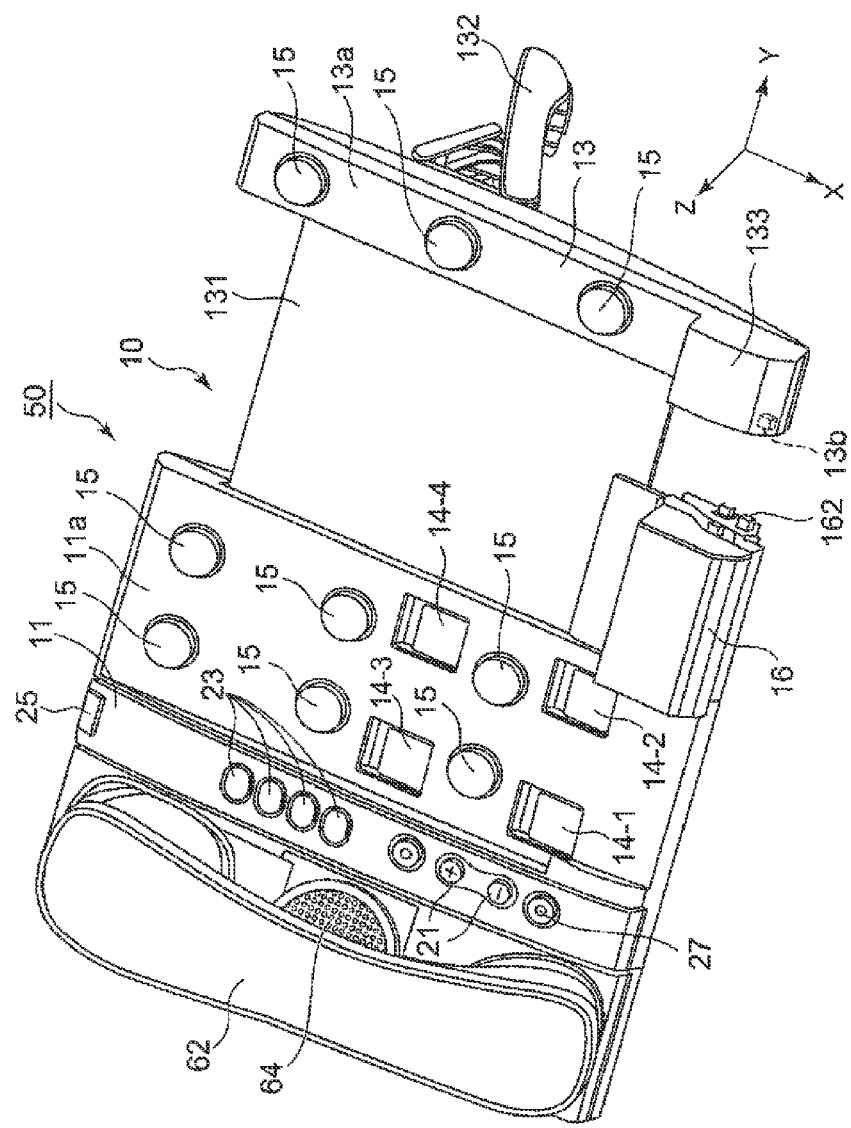
FIG. 11 is a perspective view illustrating a second step of fixing the cradle to the lower end of the slide plate in the desk phone of FIG. 6.

Next, referring to FIGS. 10 and 11, description is given of a procedure of fixing the cradle 16 to the lower end of the slide plate 131 in the desk phone 50 of FIG. 6.

The cradle 16 has a first protrusion 161 at its second side edge portion (left side edge portion), and a second protrusion 162 at its first side edge portion (right side edge portion).

On the other hand, the holding base main body 11 has a first fitting hole 11b at a lower part of its first side edge portion (right side edge portion), to which the first protrusion 161 is to be fitted. The extensible holding member 13 has a second fitting hole 13b at a lower part of its second side edge portion (left side edge portion), to which the second protrusion 162 is to be fitted.

First, as illustrated in FIG. 10, the extensible holding member 13 is extended to its maximum extension position. In this state, the first protrusion 161 of the cradle 16 is fitted to the first fitting hole 11b of the holding base main body 11.

Subsequently, as illustrated in FIG. 11, the second protrusion 162 of the cradle 16 is fitted to the second fitting hole 13b of the extensible holding member 13.

Thus, the cradle 16 is fixed to the lower end of the slide plate 131 at the position between the main mounting surface 11a and the extensible mounting surface 13a.

Note that, in the above-mentioned example, the first and second protrusions 161 and 162 are provided to the cradle 16, and the first and second fitting holes 11b and 13b are provided to the holding base main body 11 and the extensible holding member 13, respectively, but the present invention is not limited to this fitting structure. For example, the first protrusion and the second fitting hole may be provided to the cradle 16, and the first fitting hole and the second protrusion may be provided to the holding base main body 11 and the extensible holding member 13, respectively. Conversely, the first fitting hole and the second protrusion may be provided to the cradle 16, and the first protrusion and the second fitting hole may be provided to the holding base main body 11 and the extensible holding member 13, respectively.

In the above-mentioned second embodiment of this invention, the following effects are attained.

The first effect is that the first portable information device (smartphone) 30 can freely be held at a position desired by the user. The reason is because the portable information device holding base 10 of the desk phone 50 includes the plurality of cradle tabs 14-1 to 14-4 as well as the terminal cover 12.

The second effect is that the second portable information device (tablet device) 40 can be held as well as the first portable information device (smartphone) 30. The reason is because the desk phone 50 includes the extensible holding member 13 comprising the slide plate 131 that is slidable from inside the holding base main body 11.

The third effect is that the desk phone 50 can be used as the IP phone. The reason is because the desk phone 50 includes the handset 62.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, in the portable information terminal holding base 10 and the desk phone 50 according to the above-mentioned exemplary embodiments, exemplary description has been given of the case of holding one of the two types of portable information terminals including the first portable information terminal (smartphone) 30 and the second portable information terminal (tablet terminal) 40. A person having ordinary skill in the art may easily arrive at such a modification that the portable information terminal holding base 10 and the desk phone 50 are configured to hold one of three or more types of portable information terminals.

REFERENCE SIGNS LIST 10 portable information terminal holding base
11 holding base main body
11a main mounting surface
11b first fitting hole
12 terminal cover
13 extensible holding member
13a extensible mounting surface
13b second fitting hole
131 slide plate
132 leg
133 stopper
14-1 to 14-4 cradle tab
15 cushion
16 cradle
161 first protrusion
162 second protrusion
17 charging connector
21 volume button
23 function button
25 call lamp
27 Bluetooth module cooperation button
30 first portable information terminal (smartphone)
40 second portable information terminal (tablet terminal)
50 desk phone
62 handset
64 loudspeaker This application is based upon and claims the benefit of priority from Japanese Patent Application No. 2011-208533, filed on Sep. 26, 2011, the disclosure of which is incorporated herein in its entirety by reference.

The invention claimed is:

1. A portable information terminal holding base capable of holding one of a plurality of types of portable information terminals including at least a first portable information terminal and a second portable information terminal having larger length and width sizes than the first portable information terminal, the portable information terminal holding base comprising:

a holding base main body having a main mounting surface that is inclined with respect to a horizontal surface and that is wider than a mounting surface of the first portable information terminal;

a terminal cover to be fixed to a lower end of the main mounting surface, the terminal cover being configured to support a lower end of the one of the plurality of types of portable information terminals to be held on the main mounting surface;

an extensible holding member provided on a first side edge portion side of the holding base main body, the extensible holding member comprising a slide plate that is slidable inside the holding base main body, the extensible holding member having an extensible mounting surface that is movable in parallel to the main mounting surface, the extensible holding member being capable of holding the second portable information device when the extensible holding member is extended to a predetermined extension position; and a plurality of cradle tabs provided on the main mounting surface with apart from each other in an up-and-down direction and in a right-and-left direction, the plurality of cradle tabs being brought into a state of being embedded below the main mounting surface when the plurality of cradle tabs are folded, and being projected above the main mounting surface when the plurality of cradle tabs are raised, thereby being capable of supporting a lower end of the first portable information terminal on the main mounting surface.

2. A portable information device holding base according to claim 1, wherein the extensible holding member comprises a stopper for supporting a lower end of the second portable information terminal when the extensible holding member is extended to the predetermined extension position.

3. A portable information device holding base according to claim 1, further comprising a plurality of cushions formed on the main mounting surface and the extensible mounting surface.

4. A portable information device holding base according to claim 1, further comprising a cradle to be fixed to a lower end of the slide plate at a position between the main mounting surface and the extensible mounting surface when the extensible holding member is extended to the predetermined extension position.

5. A desk phone, comprising:
the portable information terminal holding base according to claim 1; and
a handset provided on a second side edge portion side of the holding base main body that is opposite to the extensible holding member.

* * * * *